Figure 1:
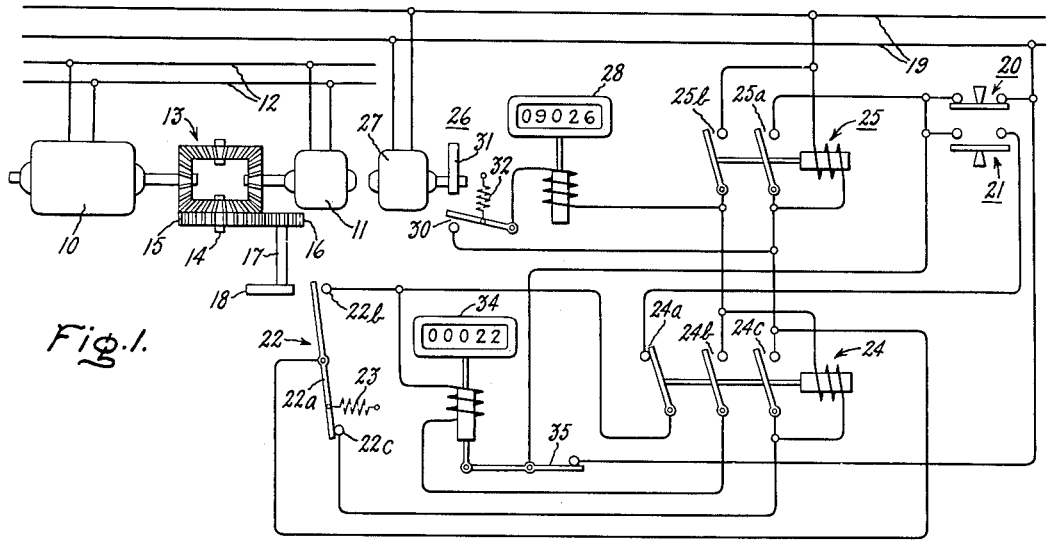

May 22, 1956  J. D. McLAREN  2,746,683
APPARATUS FOR MEASURING ROTATION OF A SHAFT
Filed Feb. 24, 1955

Inventor:
James D. McLaren,
by Merton D Moore
His Attorney.

United States Patent Office 2,746,683
Patented May 22, 1956

2,746,683

APPARATUS FOR MEASURING ROTATION OF A SHAFT

James D. McLaren, Amsterdam, N. Y., assignor to General Electric Company, a corporation of New York Application February 24, 1955, Serial No. 490,254

12 Claims. (Cl. 235—103.5)

This invention relates to apparatus for measuring the rotation of a shaft.

It has been generally customary in the past to measure the speed of a relatively slowly rotating shaft by manual methods. For example, the number of rotations of the shaft may be counted by an observer, who also measures the period of time over which he makes the count. Conducting such a measurement not only requires the undivided attention of an operator, but provides opportunity for human errors in counting the revolutions or measuring the timing period to invalidate the measurement.

One of the principal difficulties encountered in providing apparatus for measuring the rotation automatically lies in the matter of accuracy. If the start of the timing period and the start of the revolution counting function do not occur simultaneously, the number of revolutions counted for a given time interval may be in error. For example, if an index point on the shaft whose revolutions are being counted passes a reference point and a count is made just after the timing period has started, the final count will be in error by one revolution for the indicated period of time. On the other hand, if the timing period is started just after the index point passes the reference point, the final count may be approximately correct. Hence, it is difficult to determine whether the count is correct or in error by an amount up to one revolution for the indicated period of time.

Accordingly, a primary object of the present invention is to provide apparatus for measuring the speed of a rotating shaft, which apparatus embodies means for initiating the timing function and the revolution counting function simultaneously, whereby the indicated number of revolutions of the shaft is completely accurate for the indicated period of time.

Another object of the invention is to provide such apparatus by means of which the speed of rotation of a shaft may be measured in fractions of a revolution; that is, if the speed is quite slow, it may be accurately measured in a period of time much less than is required for the shaft to make one complete revolution.

A further object is to provide apparatus for measuring over a desired period of time the total rotation of a shaft, whether that rotation occurs at an irregular or a constant rate.

Apparatus constructed in accordance with the invention may comprise means mounted on the shaft whose rotation is to be measured for momentarily actuating a switch at predetermined rotational positions of the shaft. The first time the switch is actuated after the equipment is initially energized, a timing counter is energized and the measurement period is started. However, means are provided to prevent energization at that time of counting means which are normally energized when the switch is actuated to record the rotations of the shaft. The second and each succeeding time that the switch is actuated by rotation of the shaft, the rotation counting means are energized and a count is made. Thus, the start of the timing period and the start of the counting function coincide exactly in time.

In order to end the timing and counting functions at an integral number of counts, means are provided to prevent de-energizing the apparatus until the counting means have been once more actuated, even after the operator has attempted to de-energize the circuit. Thus, it is certain that the rotations indicated by the counting means occurred in exactly the period of time indicated by the timing counter.

The means carried by the shaft for momentarily actuating the switch means may be adapted to perform that function once for each revolution of the shaft, or may be of a type to actuate the switch any desired number of times for each revolution of the shaft. Thus, the apparatus may be adapted to measure speeds of less than one revolution over a given period of measurement time.

The novel features which are believed to be characteristic of the invention are set forth with particularity in the appended claims. The invention itself, however, both as to its organization and method of operation, together with further objects and advantages thereof, may best be understood by reference to the following description, taken in connection with the accompanying drawings, in which Fig. 1 is a schematic diagram of one form of apparatus constructed in accordance with the invention for measuring shaft speed in terms of complete revolutions, and adapted to measure the difference in speed between two rotating machines; and Fig. 2 is a schematic diagram of a modified form of apparatus for measuring speed in terms of fractions of a revolution, adapted similarly to the apparatus shown in Fig. 1.

The apparatus of the invention finds particular usefulness when embodied in apparatus for measuring the difference in speed between two rotating machines, such for example as electric motors, and hence it will be described in that connection. However, it is to be understood that the invention is not limited to any particular use and may be utilized to measure the rotation of any relatively slowly moving shaft.

Figure 2:
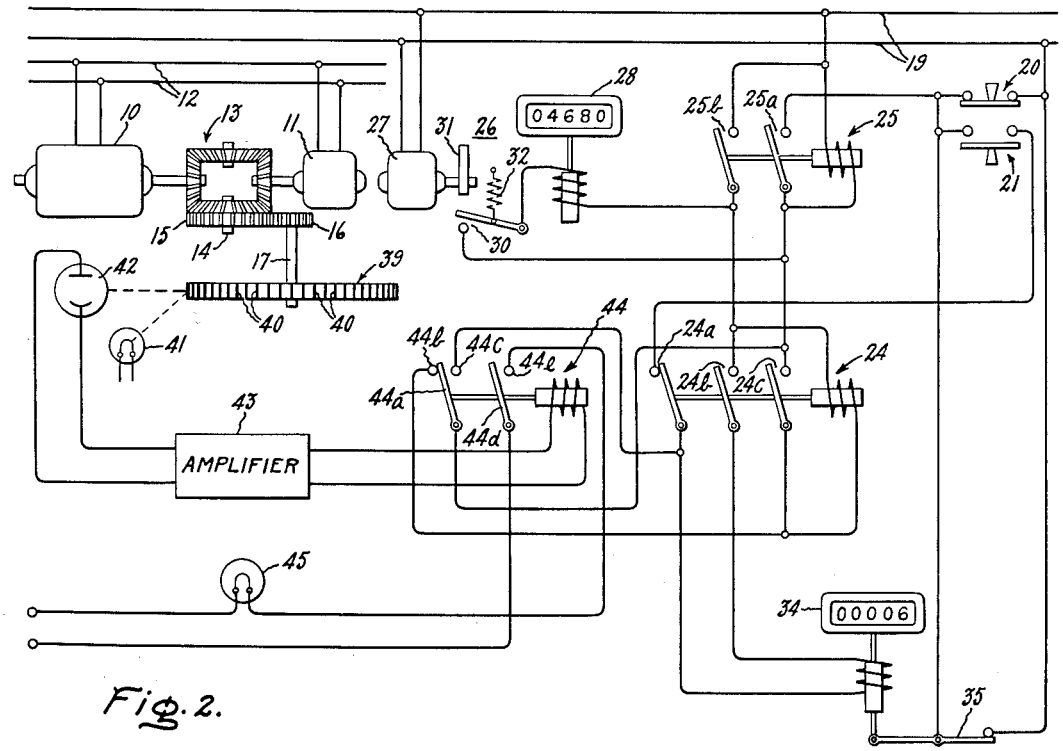

Referring now to the drawing, Fig. 1 illustrates a form of the invention adapted to measure the difference in speed between a motor 10 under test and a synchronous motor 11, which rotates at a known speed. The two motors 10 and 11 may be energized from a common source, such as conventional alternating current line 12, and a switch (not shown) may be placed in the line to turn on and off the motors. With this arrangement, the known speed of the synchronous motor 11 may serve as a standard, and the difference in speed or "slip" of the motor 10 measured against that standard.

The rotors of the motor 10 under test and the motor 11 are connected to the two inputs of a conventional mechanical differential 13 having an output shaft 14 that rotates at a speed equal to one-half the difference in speed between the two input shafts. If desired, gears may be provided between the motors and the differential inputs to provide for differences in rates of speed between the two motors, so that the speed of a single synchronous motor may serve as a standard against which various motors having different speed ratings may be tested. The output shaft 14 of the differential has secured thereto a gear 15 that drives a gear 16 mounted on a shaft 17, with the ratio between the gears 15 and 16 being such that the shaft 17 turns at a speed equal to the difference in speed between the two input shafts of the differential 13. A cam 18 fixed to shaft 17 is the primary actuating element for the timing and counting portions of the apparatus.

The use of the gears 15 and 16 or gears between the motors and the differential inputs is a matter of choice, and in some applications the cam 18 may be fixed directly on the shaft whose speed of rotation is being measured. Of course, the invention is not limited to the use of a differential or any other particular arrangement for driving the shaft whose speed is to be measured.

Power is supplied to the apparatus, excluding the motors 10 and 11, from supply line 19, and energization of the apparatus is controlled by a pair of switches 20 and 21, the switch 20 being normally closed and serving as a "stop" switch and the switch 21 being normally open and serving as a "start" switch. Switches 20 and 21 may be of conventional momentary contact type.

As previously stated, one of the outstanding features of the present invention is that the timing and counting operations are initiated simultaneously. This is accomplished by controlling both operations with a single actuating element, the cam 18, which is mounted on shaft 17, and in this case, is driven by the output shaft of the differential 13. The cam 18 is arranged as it rotates to engage and move an arm 22a of a switch 22 having a pair of contacts 22b and 22c, with arm 22a normally biased into engagement with contact 22c by a spring 23. Assuming the cam 18 is not engaging the arm 22a, when the "start" switch 21 is closed by an operator, the only immediate effect is to connect one side of the power line 19 to contact 22b through switches 20 and 21 and a section 24a of a conventional relay 24, whose operating winding is normally de-energized. The remainder of the circuit is not energized until the cam 18 has rotated a sufficient amount to engage the arm 22a of switch 22 and move it into contact with contact 22b. Therefore, the operator must hold switch 21 closed until that action takes place.

As the cam 18 rotates, it engages arm 22a of switch 22 and forces it into contact with contact 22b. Thus a circuit is completed through the switches 20 and 21, section 24a of relay 24, and contact 22b and arm 22a of switch 22 to energize the operating winding of a relay 25. When the operating winding of relay 25 is energized, the relay closes and seals itself in the closed position through section 25a, and section 25b of the relay energizes a timing mechanism, shown generally by the numeral 26. At this time, the "start" switch 21 may be allowed to open.

The timing mechanism 26 comprises a motor 27, a counter 28, a switch 30, and a cam 31 mounted on the shaft of motor 27 and adapted momentarily to close switch 30 against the resistance of a spring 32 once during every revolution of the shaft of motor 27. These elements cooperate to give an accurate indication of the length of time over which the speed difference between the test motors is measured.

The motor 27 is preferably of synchronous type and is energized from a constant frequency source (not shown) to which supply lines 19 are connected. If desired, the motor may be provided with a switch (not shown) so that it may be energized at the same time as the motors 10 and 11. However, even if the motor 27 is rotating, there is no energization of the remainder of the timing circuit until the relay 25 closes, as previously described. Power is supplied to the circuit comprising the operating winding of counter 28 and switch 30 when the relay 25 closes. As the motor 27 rotates and cam 31 momentarily closes switch 30 against the resistance of spring 32, the circuit is momentarily completed through the operating winding of counter 28 and the counter is actuated.

The counter 28 is shown as having a movable armature which, when moved by energization of the counter operating winding, actuates the counter. It is understood, however, that this representation is diagrammatic, and any counter of the type which functions to increase its reading by one digit each time its operating winding is energized may be used in this application. Such counters are well known in the art and readily available commercially.

As previously mentioned, when the arm 22a of switch 22 engages contact 22b the first time after the "start" switch 21 is closed, the timing circuit is energized and the timed period begins. When the relay 25 closes to energize the timing circuit, a circuit is also provided through section 25b of that relay, the operating winding of relay 24 and contact 22c and arm 22a of switch 22. However, this circuit will not be completed until arm 22a engages contact 22c of switch 22, which will occur when the cam 18 has rotated a sufficient amount to allow the arm to disengage itself from contact 22b and engage contact 22c under the influence of spring 23. When that action occurs, the operating winding of relay 24 is energized, section 24a of the relay is opened, and sections 24b and 24c are closed. Section 24c serves to seal in the operating winding of the relay 24 to retain the relay in closed position. Thus, the apparatus is readied for counting the revolutions of the shaft 17 and cam 18.

A counter 34 similar to the counter 28 previously described is connected to be energized through section 25b of relay 25, section 24b of relay 24, contact 22b and arm 22a of switch 22, section 25a of relay 25, and "stop" switch 20. Of course, the circuit will not be completed until the cam 18 has caused the arm 22a of switch 22 to engage contact 22b. This occurs one complete revolution of the cam after the timing operation has been started, as previously described, at which time counter 34 will register its first count. The armature of the counter 34 is connected to a switch 35, whose operation will be later described, whereby each time the counter 34 is actuated the switch 35 opens momentarily.

Because the timing motor 27 is of the synchronous type energized from a constant frequency source, it is rotating at a constant, known speed, and the number of revolutions made by the motor 27 as shown on counter 28 are an accurate indication of the length of time that the timing circuit has been energized. Therefore, after the shaft 17 has made a number of revolutions, as shown on the counter 34, the apparatus may be stopped and the difference in speed (in revolutions per unit time) between the motors 10 and 11 computed from the readings of the counters 28 and 34 by simple mathematical calculation.

The apparatus is de-energized by depressing the "stop" switch 20. However, it is seen that the switch 35, which is actuated by the counter 34, is connected in parallel with the "stop" switch, and hence opening switch 20 will not de-energize the circuit until the next revolution of cam 18 is registered on counter 34, at which time switch 35 is momentarily opened. Of course, the operator must hold switch 20 open until switch 35 opens. Thus, operation can not be stopped in the middle of a revolution of the output shaft of the differential, and it is ensured that the position of the shaft 17 at the end of the timing period is exactly the same as at the beginning of the period. Thus, only a complete number of revolutions are counted and the timing counts and revolution counts are completely accurate.

Because the form of the invention shown in Fig. 1 counts only complete revolutions of the shaft 17, an unduly long period of time may be required to make the measurement if the difference in speed between the two motors is small and the shaft 17 rotates very slowly. For example, if the speed difference between the two motors is of the order of a fraction of a revolution per minute, a number of minutes may be required in order to measure even one revolution of the shaft 17. This difficulty is eliminated in the form of the invention shown in Fig. 2.

The apparatus shown in Fig. 2 is generally similar to that previously described with reference to Fig. 1, and the same reference numerals are applied to corresponding parts. The two embodiments differ primarily in that the apparatus shown in Fig. 2 is capable of measuring fractions of a revolution of the shaft 17 rather than only complete revolutions. The shaft 17, which is rotated by the output shaft 14 of the differential 13, is provided with a wheel 39 having a plurality of plane mirrors 40 are aranged as the wheel 39 rotates to reflect light momentarily and in succession from a light source 41 to a photocell 42. The light source 41 may be energized from a conventional power line or battery (not shown). Thus, as wheel 39, rotates, the photocell 42 receives a train of pulses of light with each pulse corresponding to rotation of the shaft 17 of a fraction of a revolution. The number of mirrors 40 distributed about the periphery of the wheel 39 determines the number of pulses for each revolution of the shaft, and the number of mirrors utilized may be determined by the requirements of the application. Of course, they should be equally spaced about the periphery of the wheel.

The electrical pulses developed by the phototube 42 in response to the pulses of light reflected thereon from the mirrors 40 are connected into a conventional amplifier 43, and the output of the amplifier 43 is connected to the operating winding of a relay 44. The relay 44 functions as switch means in much the same manner as the cam-operated switch 22 described with reference to Fig. 1, and the actuating coil of the rotation counter 34 is energized through a section of the relay having an arm 44a and contacts 44b and 44c. The circuit for energizing the counter 34 runs from the upper side of the line 19, through section 25b of relay 25, section 24b of relay 24, the coil of counter 34, contact 44c and arm 44a of relay 44, section 25a of relay 25 and stop switch 20 to the other side of the line 19.

The relay 44 is provided with a second section comprising arm 44d and contact 44e, which may be utilized to complete a circuit for energizing an indicator lamp 45 from a conventional source of current (not shown).

In operation, the apparatus shown in Fig. 2 is similar to that shown in Fig. 1. When the "start" switch 21 is initially closed, voltage is placed on the contact 44c of relay 44 through switches 20 and 21 and section 24a of relay 24. The first time that light strikes the photocell 42 after the "start" switch 21 is closed, a pulse of current energizes the operating winding of relay 44 and causes arm 44a to engage contact 44c. At that time, the operating winding of relay 25 is energized to close the relay and energize the timing circuit 25 to start counting the revolutions of synchronous motor 26. Section 24b of relay 24 is open, and the rotation counter 34 is not actuated. As the wheel 39 rotates slightly farther and light no longer falls on photocell 42, relay 44 is de-energized and arm 44a again engages contact 44b. This causes the operating winding of relay 24 to be energized through sections 25a and 25b of relay 25 and connects the actuating coil of rotation counter 34 to be energized the next time relay 44 closes. From that time until the end of the counting period, the rotation counter 34 is actuated each time relay 44 is caused to close by a pulse of light falling on photocell 42.

At the end of the desired period of time, the operator opens "stop" switch 20 and holds the switch open until the apparatus has stopped. That will occur when rotation counter 34 is actuated once again and switch 35 in parallel with switch 20 is opened.

It is now apparent that the apparatus of the invention possesses several outstanding features. For example, the timing period is stopped and started at definite times that correspond to predetermined positions of the shaft 17. The shaft must have made an exact number of revolutions or fractions of a revolution during the counting period, and there is no possibility of there being an uncounted revolution or fraction of a revolution. Furthermore, there is no possibility that more revolutions or fraction of a revolution will be made than are indicated by the counter.

The apparatus of the invention is well suited to measuring total rotation of a shaft over any desired time interval, even if the rotation is intermittent or irregular. In that application, it may be desirable to provide gears between the timing motor 27 and the cam 31 driven thereby, so that timing counter 28 is actuated once for several revolutions of the motor. Thus, measurements may be made over longer time intervals than when each revolution of the timing motor is recorded.

Although particular embodiments of the invention have been illustrated, it will be understood that the invention is not limited thereto, since various modifications both in the circuit arrangement and in the instrumentalities employed may be made. It is contemplated by the appended claims to cover any such modifications as fall within the true spirit and scope of the invention.

What I claim as new and desire to secure by Letters Patent of the United States is:

1. Apparatus for measuring the rotation of a shaft comprising means for energizing said apparatus, counting means, switch means for connecting said counting means to said energizing means, means carried by said shaft for actuating said switch means momentarily to energize said counting means at at least one predetermined rotational position of said shaft, timing means, means connected in circuit relationship with said switch means and said energizing means for energizing said timing means the first time said switch means is actuated after energization of said apparatus, and means connected in circuit relationship with said switch means for preventing the momentary energization of said counting means said first time said switch means is actuated.

2. Apparatus for measuring the rotation of a shaft comprising means for energizing said apparatus, counting means, switch means for connecting said counting means to said energizing means, means carried by said shaft for actuating said switch means momentarily to energize said counting means at at least one predetermined rotational position of said shaft, timing means, means connected in circuit relationship with said switch means and said energizing means for energizing said timing means the first time said switch means is actuated after energization of said apparatus, means connected in circuit relationship with said switch means for preventing the momentary energization of said counting means said first time said switch means is actuated, means for de-energizing said apparatus, and means connected in circuit relationship with said deenergizing means and operatively associated with said counting means to prevent de-energization of said apparatus until said counting means is momentarily energized.

3. Apparatus for measuring the rotation of a shaft comprising means for energizing said apparatus, counting means, switch means for connecting said counting means to said energizing means, means carried by said shaft for actuating said switch means momentarily to energize said counting means at at least one predetermined rotational position of said shaft, timing means, relay means connected in circuit relationship with said switch means and said energizing means for energizing said timing means the first time said switch means is actuated after energization of said apparatus and for maintaining said timing means energized until de-energization of said apparatus, and relay means connected in circuit relationship with said switch means for preventing the momentary energization of said counting means said first time said switch means is actuated and permitting momentary energization of said counting means each successive time said switch means is actuated.

4. Apparatus for measuring the rotation of a shaft comprising means for energizing said apparatus, counting means, switch means for connecting said counting means to said energizing means, means carried by said shaft for actuating said switch means momentarily to energize said counting means at at least one predetermined rotational position of said shaft, timing means, relay means connected in circuit relationship with said switch means and said energizing means for energizing said timing means the first time said switch means is actuated after energization of said apparatus and for maintaining said timing means energized until de-energization of said apparatus, relay means connected in circuit relationship with said switch means for preventing the momentary energization of said counting means said first time said switch means is actuated and permitting momentary energization of said counting means each successive time said switch means is actuated, means for de-energizing said apparatus, and means connected in circuit relationship with said deenergizing means and operatively associated with said counting means to prevent de-energization of said apparatus until said counting means is momentarily energized.

5. Apparatus for measuring the difference in speed between two rotating shafts comprising means for producing rotation of a third shaft at a speed proportional to the difference in speed between said first two shafts, means for energizing said apparatus, counting means, switch means for connecting said counting means to said energizing means, means carried by said third shaft for actuating said switch means momentarily to energize said counting means at at least one predetermined rotational position of said third shaft, timing means, means connected in circuit relationship with said switch means and said energizing means for energizing said timing means the first time said switch means is actuated after energization of said apparatus, and means connected in circuit relationship with said switch means and said counting means for preventing the momentary energization of said counting means said first time said switch means is actuated.

6. Apparatus for measuring the difference in speed between two rotating shafts comprising means for producing rotation of a third shaft at a speed proportional to the difference in speed between said first two shafts, means for energizing said apparatus, counting means, switch means for connecting said counting means to said energizing means, means carried by said third shaft for actuating said switch means momentarily to energize said counting means at at least one predetermined rotational position of said third shaft, timing means, means connected in circuit relationship with said switch means and said energizing means for energizing said timing means the first time said switch means is actuated after energization of said apparatus, means connected in circuit relationship with said switch means for preventing the momentary energization of said counting means said first time said switch means is actuated, means for de-energizing said apparatus, and means connected in circuit relationship with said de-energizing means and operatively associated with said counting means to prevent de-energization of said apparatus until said counting means is momentarily energized.

7. Apparatus for measuring the difference in speed between two rotating shafts comprising means for producing rotation of a third shaft at a speed proportional to the difference in speed between said first two shafts, means for energizing said apparatus, counting means, switch means for connecting said counting means to said energizing means, means carried by said third shaft for actuating said switch means momentarily to energize said counting means at at least one predetermined rotational position of said third shaft, timing means, relay means connected in circuit relationship with said switch means and said energizing means for energizing said timing means the first time said switch means is actuated after energization of said apparatus and for maintaining said timing means energized until de-energization of said apparatus, and relay means connected in circuit relationship with said switch means for preventing the momentary energization of said counting means said first time said switch means is actuated and permitting momentary energization of said counter means each successive time said switch means is actuated.

8. Apparatus for measuring the difference in speed between two rotating shafts comprising means for producing rotation of a third shaft at a speed proportional to the difference in speed between said first two shafts, means for energizing said apparatus, counting means, switch means for connecting said counting means to said energizing means, means carried by said third shaft for actuating said switch means momentarily to energize said counting means at at least one predetermined rotational position of said third shaft, timing means, relay means connected in circuit relationship with said switch means and said energizing means for energizing said timing means the first time said switch means is actuated after energization of said apparatus and for maintaining said timing means energized until de-energization of said apparatus, and means connected in circuit relationship with said switch means for preventing the momentary energization of said counting means said first time said switch means is actuated and permitting momentary energization of said counting means each successive time said switch means is actuated, means for de-energizing said apparatus, and means connected in circuit relationship with said de-energizing means and operatively associated with said counting means to prevent de-energization of said apparatus until said counting means is momentarily energized.

9. Apparatus for measuring the rotation of a shaft comprising means for energizing said apparatus, counting means, a switch for connecting said counting means to said energizing means, cam means carried by said shaft for actuating said switch momentarily to energize said counting means at at least one predetermined rotational position of said shaft, timing means, means connected in circuit relationship with said switch and said energizing means for energizing said timing means the first time said switch is actuated after energization of said apparatus, means connected in circuit relationship with said switch for preventing the momentary energization of said counting means said first time said switch is actuated, means for de-energizing said apparatus, and means connected in circuit relationship with said de-energizing means and operatively associated with said counting means to prevent de-energization of said apparatus until said counting means is momentarily energized.

10. Apparatus for measuring the rotation of a shaft comprising means for energizing said apparatus, counting means, a switch for connecting said counting means to said energizing means, cam means carried by said shaft for actuating said switch momentarily to energize said counting means at at least one predetermined rotational position of said shaft, timing means, relay means connected in circuit relationship with said switch and said energizing means for energizing said timing means the first time said switch is actuated after energization of said apparatus and for maintaining said timing means energized until de-energization of said apparatus, relay means connected in circuit relationship with said switch for preventing the momentary energization of said counting means said first time said switch is actuated and permitting momentary energization of said counting means each successive time said switch is actuated, means for de-energizing said apparatus, and means connected in circuit relationship with said de-energizing means and operatively associated with said counting means to prevent de-energization of said apparatus until said counting means is momentarily energized.

11. Apparatus for measuring the difference in speed between two rotating shafts comprising means for producing rotation of a third shaft at a speed proportional to the difference in speed between said first two shafts, means for energizing said apparatus, counting means, a relay for connecting said counting means to said energizing means, a photocell, means connecting the output of said photocell to actuate said relay, means carried by said third shaft for energizing said photocell momentarily at a plurality of predetermined rotational positions of said third shaft, timing means, means connected in circuit relationship with said relay and said energizing means for energizing said timing means the first time said relay is actuated after energization of said apparatus, means connected in circuit relationship with said relay for preventing the momentary energization of said counting means said first time said relay is actuated, means for de-energizing said apparatus, and means connected in circuit relationship with said de-energization means and operatively associated with said counting means to prevent de-energization of said apparatus until said counting means is momentarily energized.

12. Apparatus for measuring the difference in speed between two rotating shafts comprising means for producing rotation of a third shaft at a speed proportional to the difference in speed between said first two shafts, means for energizing said apparatus, counting means, a relay for connecting said counting means to said energizing means, a photocell, means connecting the output of said photocell to actuate said relay means carried by said third shaft for energizing said photocell momentarily at a plurality of predetermined rotational positions of said third shaft, timing means, relay means connected in circuit relationship with said relay and said energizing means for energizing said timing means first time said relay is actuated after energization of said apparatus and for maintaining said timing means energized until de-energization of said apparatus, and means connected in circuit relationship with said relay for preventing the momentary energization of said counting means said first time said relay is actuated, and permitting momentary energization of said counting means each successive time said relay is actuated, means for de-energizing said apparatus, and means connected in circuit relationship with said de-energizing means and operatively associated with said counting means to prevent de-energization of said apparatus until said counting means is momentarily energized.

No references cited.